United States Patent [19]
Maggioni et al.

[11] Patent Number: 5,541,456
[45] Date of Patent: Jul. 30, 1996

[54] OUTPUT STAGE, AND AUTOMOTIVE REGULATOR, WITH SUPPLY-DEPENDENT SELECTION OF MOS OR BIPOLAR DRIVER

[75] Inventors: Giampietro Maggioni, Cornaredo; Marco Morelli, Milan, both of Italy

[73] Assignee: SGS-Thomson Microelectronics, S.r.l., Agrate Brianza (Milan), Italy

[21] Appl. No.: 259,968

[22] Filed: Jun. 14, 1994

[30] Foreign Application Priority Data

Jun. 25, 1993 [EP] European Pat. Off. .............. 93830273

[51] Int. Cl.$^6$ ..................................... H02P 9/00
[52] U.S. Cl. ................... 307/10.100; 320/61; 322/28; 327/403
[58] Field of Search ..................... 307/9.1, 10.1, 307/10.6, 10.7, 134, 130, 64, 66; 327/403–405, 537; 322/7, 8, 59, 60, 28; 323/299, 349; 290/32, 33, 36 R, 37 R, 47; 320/2, 5, 7, 9, 12, 61, 16, 63, 64

[56] References Cited

U.S. PATENT DOCUMENTS

| | | | |
|---|---|---|---|
| 4,222,001 | 9/1980 | Kofink | 322/60 |
| 4,362,983 | 12/1982 | Mori et al. | 322/28 |
| 4,488,105 | 12/1984 | Papazian | 320/64 |
| 4,694,238 | 9/1987 | Norton | 322/28 |
| 4,723,105 | 2/1988 | Matouka et al. | 320/16 |
| 4,831,322 | 5/1989 | Mashino et al. | 322/28 |
| 5,218,235 | 6/1993 | Patterson et al. | 327/537 |
| 5,343,098 | 8/1994 | Miyasaka | 327/310 |

FOREIGN PATENT DOCUMENTS

| | | |
|---|---|---|
| 210819 | 4/1987 | European Pat. Off. . |
| 382868 | 8/1990 | European Pat. Off. . |
| 2049033 | 3/1971 | France . |

OTHER PUBLICATIONS

Patent Abstracts of Japan, vol. 5, No. 78 (E-58) May 22, 1981 & JP-A-56 025 373 (NEC Corp) Mar. 11, 1981 *abstract*.

*Primary Examiner*—William M. Shoop, Jr.
*Assistant Examiner*—Richard T. Elms
*Attorney, Agent, or Firm*—Robert Groover; Betty Formby

[57] ABSTRACT

The contrasting requirements of low power consumption during operation and ability to function under drastic drops of the supply voltage at start-up of output power stages of an electric system of self-generation and recharge of a storage battery, are satisfied by an output power driving stage composed of a bipolar transistor and a field effect transistor, functionally connected in parallel to each other and having independent control terminals. A control signal is selectably switched either to the base of the bipolar output transistor or to the gate of the field effect output transistor, depending on the level of the supply voltage. A comparator comparing the voltage present on the supply node with a reference voltage controls a selection switch. The low threshold of the bipolar transistor ensures functioning at start-up, while the field effect transistor provides a low power consumption during normal running conditions.

23 Claims, 4 Drawing Sheets

OUTPUT STAGE, AND AUTOMOTIVE REGULATOR, WITH SUPPLY-DEPENDENT SELECTION OF MOS OR BIPOLAR DRIVER

CROSS-REFERENCE TO RELATED APPLICATION

This application claims priority from EPC application 93830273.4, filed Jun. 25, 1993, which is hereby incorporated by reference.

BACKGROUND AND SUMMARY OF THE INVENTION

The present invention relates to an output stage, the type of which is automatically selected depending on the supply voltage. Either a bipolar junction transistor or a field effect transistor is selected, depending upon the supply voltage level. The invention is particularly, though not exclusively, useful for implementing a regulator for an alternator of an electric system of self-generation and recharge of a storage battery.

An output stage, comprising a power transistor capable of driving a load, typically an external load that is connected to a first supply node, by functionally connecting it to a second supply node, represents the output circuit for implementing a certain function (regulation, control, actuation, charge, display, . . . ) in a vast number of applications.

Commonly, the stage may be configured as a so-called "low-side driver", usually employing a bipolar NPN transistor or an n-channel MOS transistor, or as a so-called "high-side driver", usually employing a PNP bipolar transistor or a p-channel MOS transistor.

Stringent requirements to limit power dissipation through the power transistor that drives the external load determine ever more often the choice of a field effect transistor (typically a MOS transistor), which is intrinsically capable of reducing power dissipation by about an order of magnitude as compared with a bipolar junction transistor of similar current-carrying capacity. On the other hand, a power MOS transistor hardly has a ram-on, threshold voltage below about 0.8–1 V and, typically, in the case of a transistor designed for relatively high power, the threshold voltage may raise to a value comprised between 3 V and 6 V.

However, there are many applications, especially in electric self-generation systems, wherein, during certain operating phases, for example at the start-up of the system, the supply voltage may be subject to a large drop. This may occur for example because of momentary large current absorption peaks of certain loads, for example an electric starter of a thermal engine, and similar. In other situations, as for example in the case of an electric equipment of a vehicle, certain specific requisites, such as the need of regulating the voltage powering the electric circuit of the vehicle, as produced by the alternator, already at a very low number of RPM of the thermal engine driving the alternator, may not be compatible with the relatively high threshold voltage of an output power MOS transistor. For example, during a "cold" start-up of a car engine, the voltage provided by the car battery, may momentarily drop by about 5–6 V or more. The use of a power MOS having a relatively high threshold voltage, may cause an interruption of the current delivered to the solenoids of relays that are functional to the operation of the engine or performing other important duties and undue deactivations.

In general, where the requirement of reducing power consumption is combined with the need to prevent unwanted effects of abrupt changes of the supply voltage, a "compatibility" problem may arise. For example, when MOS transistors are used as output power driving elements for reducing power consumption, a reliability problem may arise at cold start-ups.

A typical example of a system of electric self-generation is represented by the electric installation of a vehicle. Normally an alternator, driven by the thermal engine of the vehicle, is employed. Generally, the alternator is a multiphase machine (commonly a three phase machine), with stator windings connected in a star or triangle configuration. The inductor is commonly a rotor winding (field winding). Normally, a regulator is employed for controlling the voltage generated by the alternator.

A typical installation of this type is depicted in FIGS. 3 and 4.

The regulator, through a voltage regulating network formed by R1, R2, DZ1 and Q1, controls the voltage present across its terminals D– and D+ by driving, through a transistor Q2, a current through the field winding (rotor winding) of the alternator, in order to maintain the voltage generated by the alternator as constant as possible, independently of the electric load and of the speed of rotation of the rotor (and of the car engine).

In such a "monofunction" regulator system, an indicator lamp is connected between the cathodes of an auxiliary rectifier bridge and the cathodes of a main rectifier bridge. When the alternator outputs current to the loads of the electric circuit of the car, there isn't any difference of potential between said two nodes and the indicator lamp stays off. When the alternator is not delivering any current, the indicator lamp is lit, through the electric path: battery / starter-key switch / field winding / Q2.

In systems of this type, at start-up, that is when (with the engine and alternator still at rest) the starter-key switch is closed, it is desirable that the indicator lamp should light up, to signal absence of alternator current, and also to circulate a certain current through the field winding (rotor winding) of the alternator, in order to produce a certain pre-excitation of the magnetic circuit of the alternator. A pre-excitation does in fact favor the start-up of the system at a lower number of RPM than by exploiting solely the residual magnetism of the magnetic circuit.

The need for a pre-excitation phase is becoming ever more important in the car industry, where it is highly desirable to be able to regulate the voltage on the electric circuit of the vehicle already at a minimum number of RPM of the thermal engine.

At start-up, the equivalent diagram of the regulation circuit becomes that of FIGS. 5 and 6. Taking into account typical values of impedance of the components of the electric circuit of a car, it may be observed that the voltage at the supply pin (D+) of the regulator may drop as low as to about 1 V, as shown schematically in FIG. 6.

The output stage of a regulator for an alternator, that is the transistor (low-side driver or high-side driver), that controls the current through a field winding of the alternator, is normally constituted by a bipolar junction transistor (BJT) or by a field effect transistor (MOS).

A bipolar power transistor (for example Q2 in the figures) would be capable of ensuring a pre-excitation of the field winding (rotor winding) at start-up, with a supply voltage of about 1 V, because the transistor requires a voltage given by the sum of the voltage drop through the resistance R4 (FIGS.

4, 5 and 6) and of the base-emitter voltage (VBE) of the transistor itself (typically about 0.7 V) as the minimum turn-on voltage.

By contrast, the use of a bipolar transistor has the disadvantage of producing a relatively high power dissipation. In fact, by considering as an example the following typical values:

$$I_{field}=5A, V_{cesat-Q2}=0.25 V, gain_{Q2}=10, V_{reg}=14.4 V,$$

it may be calculated that the transistor will require a driving current $I_{driv}$ of about 0.50 A. Therefore, the power dissipation will be given by:

$$P_{diss=I} \cdot V_{cesat} + I_{driv} \cdot V_{reg} = 5 \cdot 0.25 + 0.5 \cdot 14.4 = 8.45 W.$$

By contrast, the use of a power MOS in place of a bipolar junction transistor, permits to practically eliminate power dissipation in driving the output transistor (voltage driving). In fact, if for example a power MOS having a series resistance comparable to that of a bipolar transistor, that is: $R_{dson}=0.25 V/5A=0.05\Omega$, is used, power dissipation will be given by:

$$P_{diss}=R_{dson} \cdot I_{field} \cdot I_{field} = 0.05 \cdot 5 \cdot 5 = 1.25 W.$$

A low power dissipation is increasingly often required in the automotive industry because a smaller power dissipation means lower junction temperature of the transistors and therefore a higher reliability of the system.

On the other hand, the use of a field effect power transistor (MOS) is not compatible with the other requirement of allowing a smooth start-up also in presence of relatively low values of the supply voltage (D+P≈1 V), because, at present, field effect power transistors that can be realized in so-called mixed-technology integrated circuit fabrication processes as well as "discrete" devices for this type of applications, have a threshold voltage of several volts, typically from 3 to 6 V.

There is a need for an output power stage (low-side driver or high-side driver) which not only has a low power dissipation, but also ensures a trouble-free operation of the system even in the presence of large drops in the supply voltage.

A main object of the present invention is to provide an output power stage having a low power dissipation under steady state working conditions and a low turn-on threshold, in order to ensure operability of the system also in presence of large drops of the supply voltage.

A further object of the present invention is to provide an automotive voltage regulator that couples a low power dissipation with the ability to function at relatively low RPM (i.e. low speed of the thermal engine driving the alternator).

These objects and advantages are obtained by an output stage characterized by employing alternatively a bipolar junction power transistor and a field effect power transistor, depending on the actual level of the supply voltage. A drive signal, produced by a voltage regulating network is automatically fed to a control terminal (base) of an output bipolar power transistor or to a control terminal (gate) of an output power field effect Transistor, by a switch driven by a comparator which compares the voltage present on the supply node with a reference voltage.

According to an another aspect of the present invention, a regulation circuit for an alternator of a self-generation and storage battery recharging system of an electric equipment of a vehicle, alternatively employs a junction bipolar transistor having a size designed to control a pre-excitation current during a pre-start-up phase of the system and a field effect power transistor, having a size suitable to control a field excitation current during normal running of the alternator. A drive signal produced by a voltage regulating network is automatically fed to a control terminal (base) of the output bipolar power transistor or to a control terminal (gain) of the output power field effect transistor, by a switch driven by a comparator which compares the voltage present on the supply node with a reference voltage.

The regulator permits a smooth start-up also at low supply voltage, by virtue of the low threshold voltage characteristic of the bipolar transistor, while, once the engine has been started, the consequent rising of the voltage on the supply node eventually causes a change of state of the comparator which switches the driving signal from the base of the bipolar transistor to the gate of the MOS transistor, which is capable thereafter of ensuring operation of the regulator with a low power dissipation.

On the other hand, because the bipolar transistor is destined to handle a relatively low current (pre-excitation current), definitely lower than the current (field winding regulating current) that is handled by the output stage during normal running of the system, the additional silicon area that is eventually required for implementing such an "auxiliary" or parallel output stage is relatively small.

According to a disclosed class of innovative embodiments, there is provided: A power driver circuit comprising: control circuitry connected to provide a logic output in a first state whenever current should be passed between a load connection and a first power supply connection; first and second power transistors each having first and second current-carrying terminals thereof connected between said load connection and said power supply connection; said first transistor having a threshold voltage greater than one Volt, and said second transistor having a threshold voltage less than one Volt; and a comparator and switching circuit connected to monitor a power supply voltage, and accordingly to route said output of said control circuitry to a control terminal of said first transistor whenever the power supply voltage is within acceptable limits, and to a control terminal of said second transistor whenever the power supply voltage is NOT within acceptable limits.

According to another disclosed class of innovative embodiments, there is provided: A voltage regulator circuit, having voltage input terminals and a current output terminal, and comprising: control circuitry connected to monitor the voltage across two voltage input terminals, and accordingly to provide a logic output in a first state whenever the voltage across said voltage input terminals falls below a predetermined threshold value; first and second power transistors each having first and second current-carrying terminals thereof connected between a current output terminal of the regulator and a fixed potential; said first transistor having a threshold voltage greater than one Volt, and said second transistor having a threshold voltage less than one Volt; and a comparator and switching circuit connected to monitor the voltage difference between said input terminals, and accordingly to route said output of said control circuitry to a control terminal of said first transistor whenever said voltage difference is within acceptable limits, and to a control terminal of said second transistor whenever said voltage difference is NOF within acceptable limits.

According to another disclosed class of innovative embodiments, there is provided: An automotive electrical supply system, comprising: an alternator having stator windings and a field winding, said stator windings being operatively connected through clamp diodes to provide a voltage between a system power supply line and a system ground connection; a voltage regulator, having voltage input terminals and a current output terminal connected to drive said field winding of said alternator, comprising: control circuitry connected to monitor the voltage across two voltage input terminals, and accordingly to provide a logic output in a first state whenever the voltage across said voltage input terminals falls below a predetermined threshold value; first and second power transistors each having first and second current-carrying terminals thereof connected between a current output terminal of the regulator and a fixed potential; said first transistor having a threshold voltage greater than one Volt, and said second transistor having a threshold voltage less than one Volt; and a comparator and switching circuit connected to monitor the voltage difference between said input terminals, and accordingly to route said output of said control circuitry to a control terminal of said first transistor whenever said voltage difference is within acceptable limits, and to a control terminal of said second transistor whenever said voltage difference is NOT within acceptable limits; a battery connected to provide voltage between said system power supply line and ground connection when said alternator is not active; and a pre-excitation load operatively connected in series between said clamp diodes and one terminal of said battery.

According to another disclosed class of innovative embodiments, there is provided: An output stage comprising: a power transistor driving a load, which is connected to a first supply node, by connecting said load to a second supply node, and a control circuit of said power transistor, comprising a bipolar power transistor and a field effect power transistor, functionally connected in parallel to each other, each having an independent control terminal; a comparator having a first input connected to said first supply node, a second input to which a reference voltage is applied and an output connected to a control terminal of a switch alternatively feeding a signal produced by said control circuit to the control terminal of said bipolar junction transistor or to the control terminal of said field effect transistor.

According to another disclosed class of innovative embodiments, there is provided: A regulating circuit for the output voltage of an alternator of an electric installation of self-generation and recharge of a storage battery, capable of forcing a pre-excitation current through a field winding of the alternator upon the closing of a startup switch of the system and to regulate the excitation current through said field winding of the running alternator, comprising: a driver transistor having a control terminal connected to the output of a voltage regulating network of the circuit, said field winding and said regulating network being powered, through said start-up switch, by said battery, a bipolar transistor and a field effect transistor, functionally connected in parallel to each other, each having an independent control terminal; a comparator having a first input connected to the supply node of said voltage regulating network, a second input to which a constant reference voltage is applied and an output connected to a control terminal of a switch capable of connecting the output of said voltage regulating network to the control terminal of said bipolar transistor or to the control terminal of said field effect transistor.

According to another disclosed class of innovative embodiments, there is provided: A method for operating an output stage, comprising the steps of: providing a power field-effect transistor in parallel with a power bipolar transistor; monitoring a power-supply voltage level; and selectively driving said bipolar transistor but not said field-effect transistor, if said monitoring step indicates that the magnitude of the power-supply voltage level is above a predefined minimum level, and otherwise selectively driving said field-effect transistor but not said bipolar transistor, if said monitoring step indicates that the magnitude of the power-supply voltage level is below said predefined minimum level.

According to another disclosed class of innovative embodiments, there is provided: A method for operating an automotive voltage regulator, comprising the steps of: generating current in an engine-driven alternator having a field coil and stator coils; monitoring the system power-supply voltage, and accordingly providing drive current to said field coil, when required, through a field-effect transistor if the system power-supply voltage is below a target voltage but not below a low-voltage limit, and providing drive current to said field coil, when required, through a bipolar transistor if the system power-supply voltage is below a target voltage and below said low-voltage limit.

BRIEF DESCRIPTION OF THE DRAWING

The disclosed inventions will be described with reference to the accompanying drawings, which show important sample embodiments of the invention and which are incorporated in the specification hereof by reference, wherein.

The different aspects and advantages of the invention will be more evident through the following description of several important embodiments and by referring to the attached drawings, wherein.

DETAILED DESCRIPTION OF THE PREFERRED EMBODIMENTS

Figure 1:
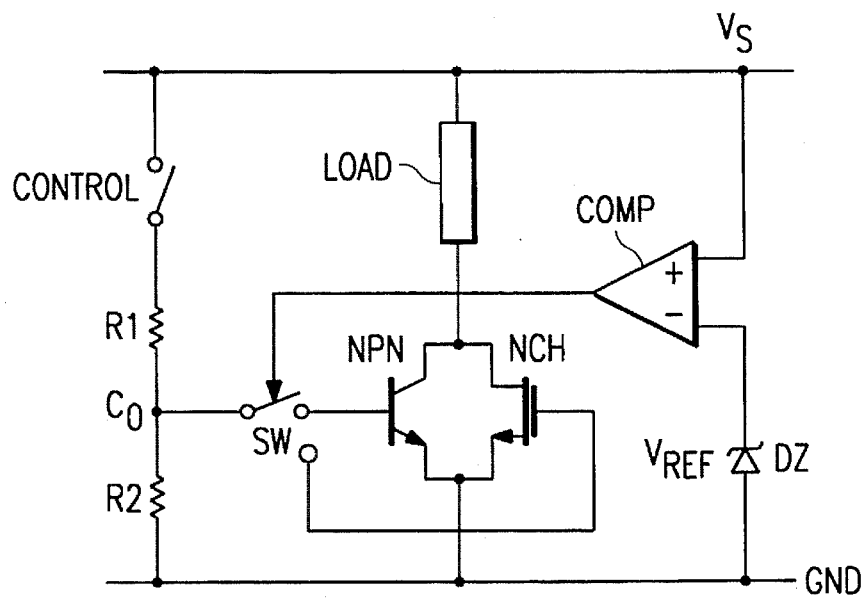
FIG. 1 is a functional diagram of a low-side driver of an automatically selected type, made according to the present invention.

The numerous innovative teachings of the present application will be described with particular reference to the presently preferred embodiment (by way of example, and not of limitation), in which:

An output stage of an automatically selected type, made according to the present invention, is schematically depicted in FIG. 1. The embodiment shown implements a so-called low-side driver, wherein a power transistor is employed for driving, by functionally connecting it to a common ground node, a load connected to a power supply node. The control circuitry is schematically identified by a CONTROL switch, capable of producing a certain voltage on the driving node Co. The output stage is composed of a "pair" of power transistors, functionally connected in parallel and having independent control terminals, a bipolar junction transistor NPN and an n-channel MOS transistor NCH. A drive selection switch SW switches the control signal present on the Co node either to the base of the NPN transistor or to the gate of the NCH transistor. The switch SW is controlled by a comparator COMP, to a first input of which the voltage present on the supply node Vs is fed and to the other input of which a constant reference voltage VREF is fed. The reference voltage VREF may be established by means of a Zener diode DZ.

The function of the comparator COMP is that of commuting the control signal Co to the base of the bipolar NPN transistor every time the voltage on the supply node Vs is lower than a certain value, that is established by the reference voltage VREF. Conversely, when the voltage Vs is higher than VREF, the comparator and the SW switch change state and the control signal present on the driving node Co is fed to the gate of the n-channel MOS transistor NCH.

Figure 2:
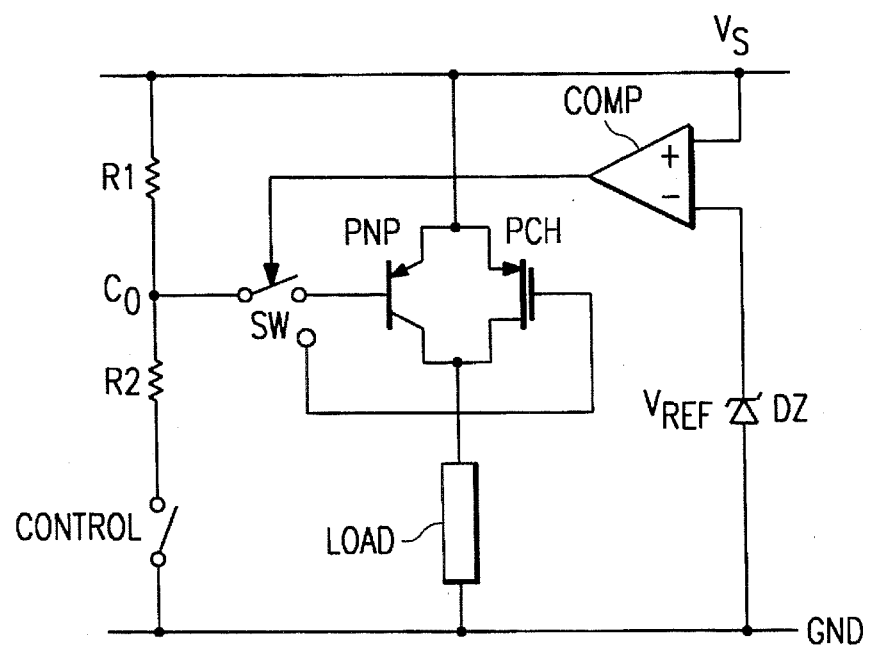
FIG. 2 is a functional diagram of a high-side driver of an automatically selected type, made according to the present invention.
Figure 3:
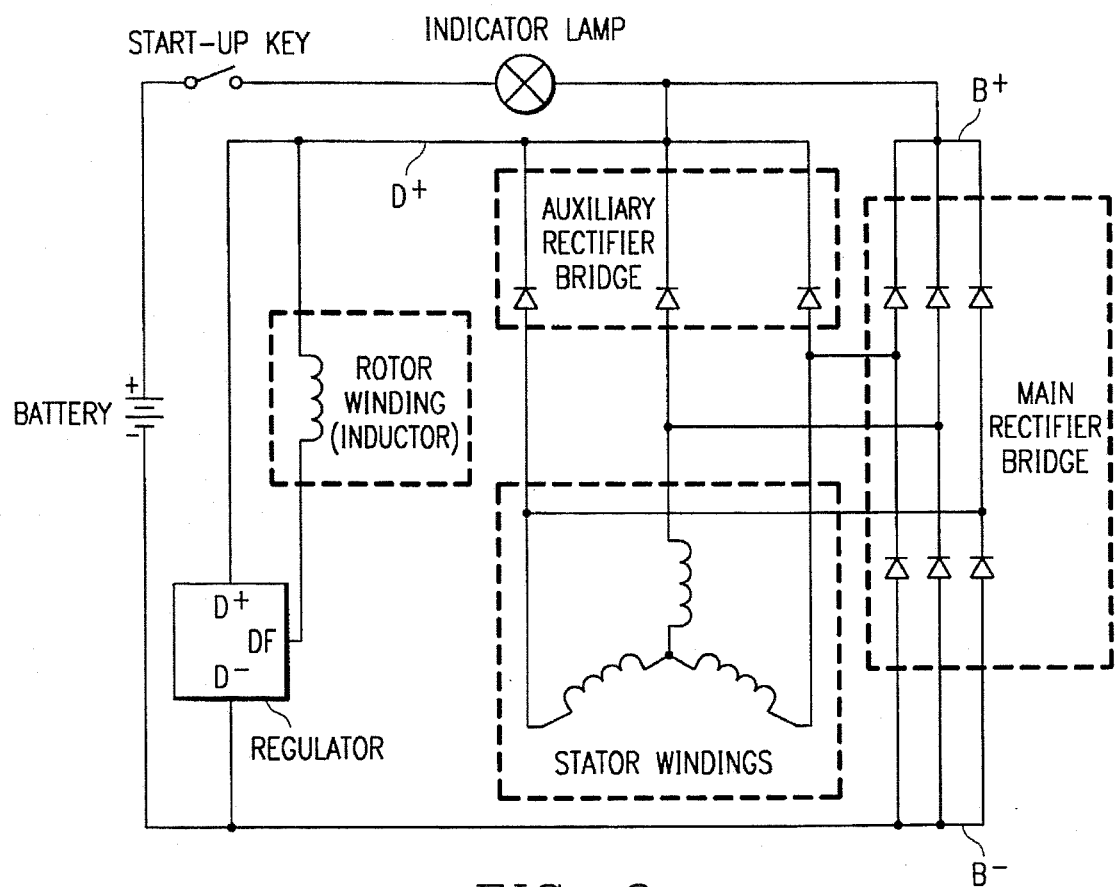
FIGS. 3, 4, 5 and 6 ;show a typical circuit of a monofunction type regulator for alternator, as employed in cars.
Figure 4:
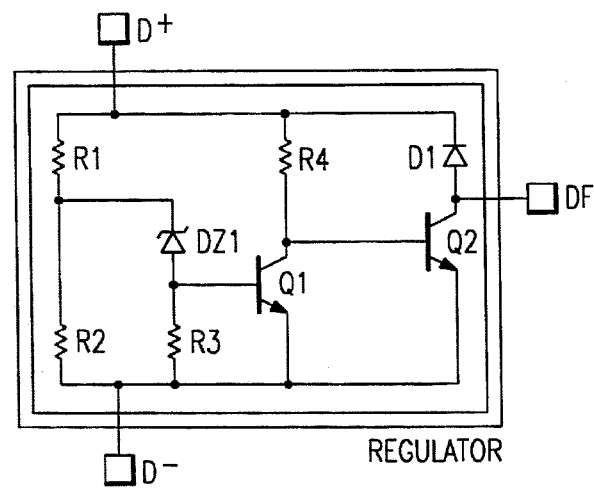
Figure 5:
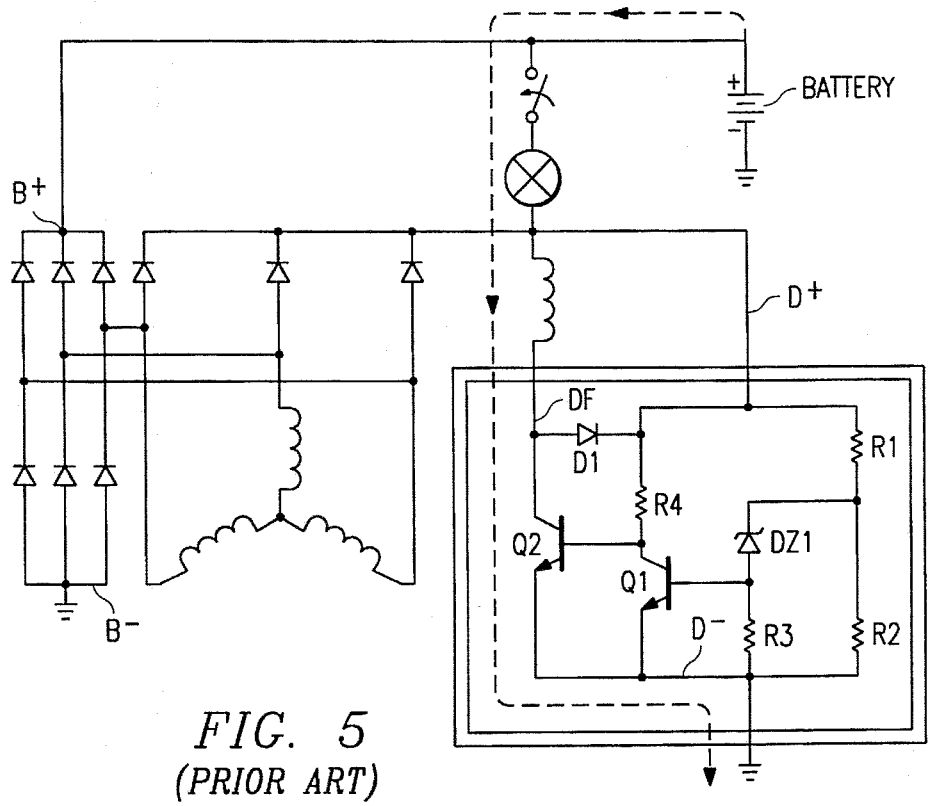
Figure 6:
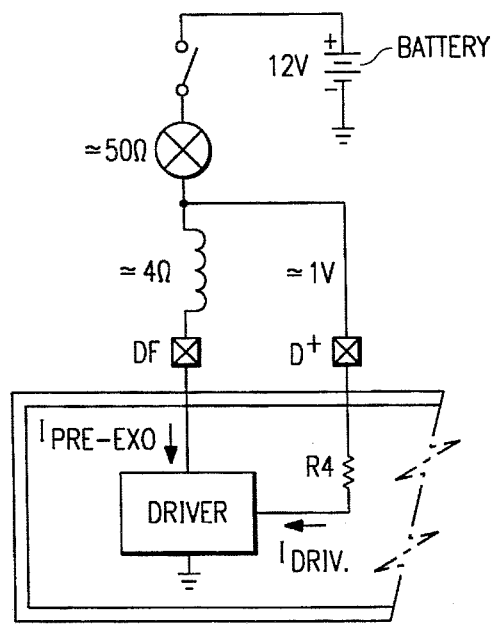

FIG. 2 shows an output stage of the invention that is configured as a so-called high-side driver. The operation of the circuit is clearly similar to the operation of the circuit of FIG. 1.

An example of application of the output stage of the invention is for driving relays or other actuators in an electric circuit of a vehicle. As it is well known, because of the strong current peak that is absorbed by an electric starter of the thermal engine of the vehicle, a voltage drop of about 7 V may occur at startup and therefore the "useful" supply voltage Vs may drop from about 12 V (a typical voltage of a lead battery) to about 5 V, although for a fraction of second (typically for a period comprised between 100 and 180 ms). In these transient conditions, a power MOS could turn-off and thus interrupt the current through the coil of a respective relay, driven by the transistor, and cause an undue disexcitation.

The circuit of the invention prevents such events. In fact, when the Vs voltage drops below the preset value VREF, the circuit automatically switches the driving signal to the base of the bipolar junction transistor, which has a threshold voltage equal or lower than 0.7 V.

On the other hand, concurrently with the large drop of the voltage, also the current that flows through the selected output transistor will proportionally drop and therefore the bipolar junction transistor may be realized by taking into account a reduced current-carrying requisite and thus have a relatively small size.

The circuit of the invention is particularly suited for implementing a monofunction regulator of an alternator of an electric self-generation system such as the one installed on cars, the peculiar requisites of which have been pointed out in the preceding description of FIGS. 3, 4, 5 and 6.

Figure 7:
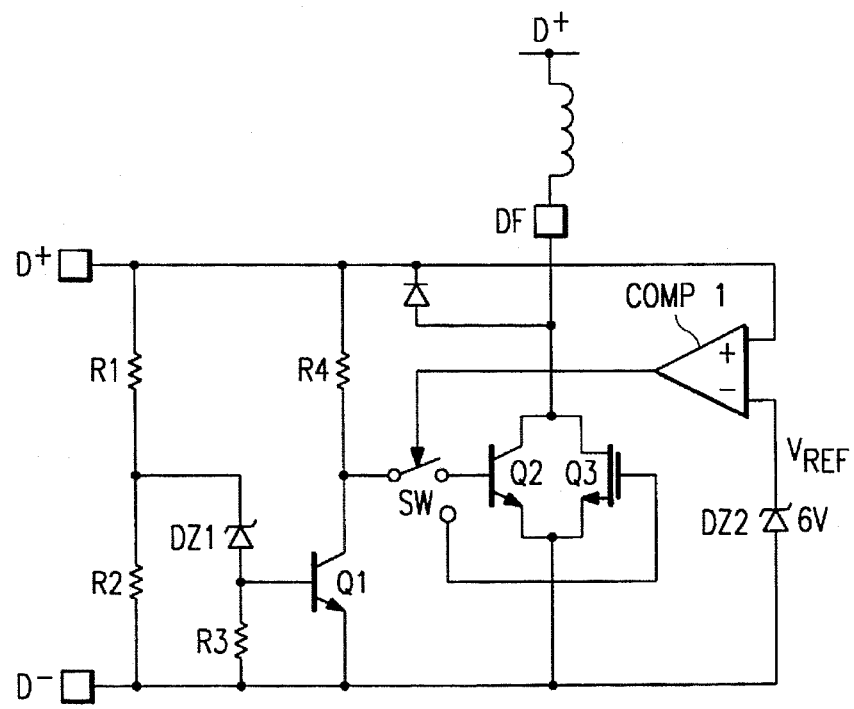
FIG. 7 is the diagram of a monofunction type regulator for alternator, made according to the present invention.

By referring to FIG. 7, the regulator of the invention may have a voltage regulating network composed of R1, R2, DZ1, R3, R4 and Q1, substantially similar to the one of a regulator of the prior art.

However, the output stage of the regulator is composed of a pair of transistors, Q2 and Q3. Q2 is a bipolar junction transistor having a size suitable to control a pre-excitation current of a field winding Lf of the alternator. Q3 is a field effect (MOS) power transistor, having a size suitable for handling the current of excitation of the field winding Lf of the alternator during normal running conditions. The driving signal is alternatively fed (switched) to the base of the bipolar transistor Q2 or to the gate of the MOS transistor Q3, depending on the voltage present on the supply node D+. This is implemented by the comparator COMP1, an input of which is connected to the supply node D+, while the other input is connected to the reference voltage, which in the shown example, may be of about 6 V and established by an appropriate Zener diode DZ2.

The comparator COMP1 drives a selection switch SW that is schematically shown in the figure. Of course, the switch SW may be implemented by one or more transistors, according to techniques that are well known to a designer.

At start-up, during: the period of time when the supply voltage drops below the reference voltage (6 V), the output state of the comparator COMP1 is such as to maintain the control signal that is produced on the output node of the Q1 transistor of the voltage regulating network, fed to the base of the bipolar transistor Q2. Upon the closing of the start-up switch (turning of the start-up key), the voltage of about 1 V that is present on the supply node D+ is sufficient to make the output transistor Q2 conducting and therefore to allow the passage of a pre-excitation current through the field winding Lf of the alternator. Once the engine is started, with the rising of the voltage on the supply node D+ toward its normal level, the comparator COMP1 eventually changes state, thus switching the driving signal from the base of Q2 to the gate of Q3. Thereafter the regulation of the voltage, during the running of the alternator is performed through the field effect power transistor Q3, which ensures a low power dissipation.

Of course, the threshold VREF must be higher than the minimum threshold voltage of the transistor Q3 and must be chosen in function of the fabrication technology of the power MOS employed.

According to a practical embodiment of the circuit of the invention for a regulator of a car alternator, the bipolar transistor Q2 should be capable of handling a pre-excitation current on the order of about 0.2 A, with a low saturation voltage. Therefore, the silicon area that is required for such an "auxiliary" output stage is relatively small. For example, in a technology where breakdown voltages must be in the range of 50 V–100 V, the area of the NPN pre-excitation transistor is about 0.2 mm$^2$. This is markedly smaller than the area ($\approx$10 mm$^2$) of a suitable MOS transistor (e.g. RDSON=50 m$\Omega$) in the same technology.

In a "smart power" embodiment, all of the devices shown in the lower part of FIG. 7 can be integrated.

Figure 8:
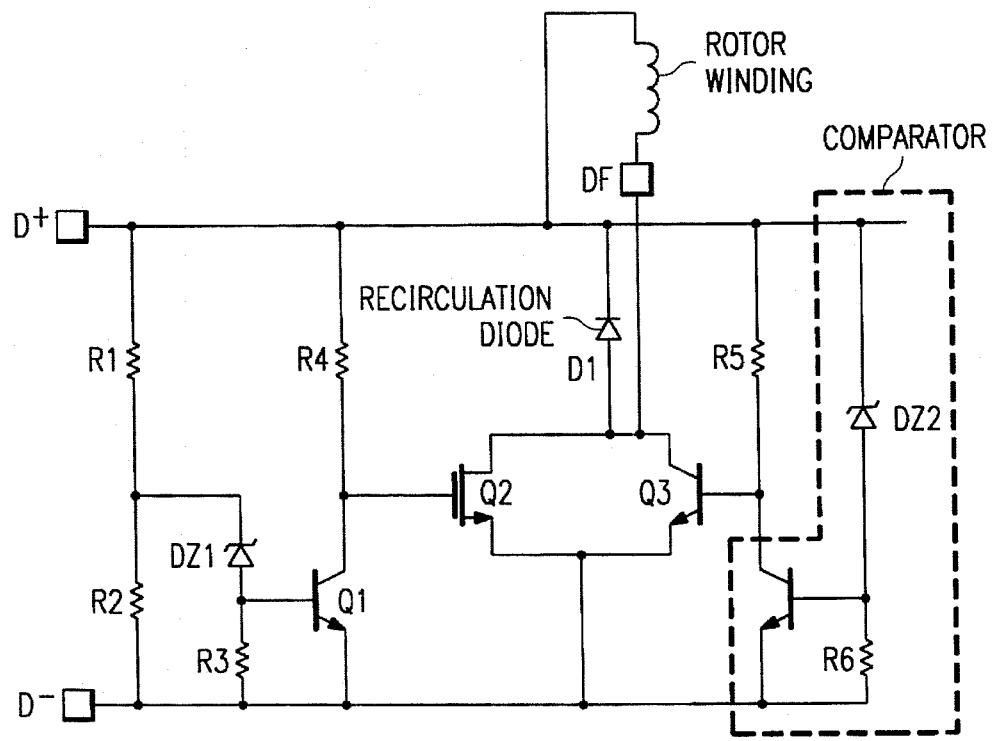
FIG. 8 shows a further sample embodiment including the comparator preferably used.

FIG. 8 shows a further sample embodiment, including details of the simple comparator preferably used. This comparator provides a threshold voltage which is equal to the drop of the Zener diode DZ2 plus the $V_{BE}$ voltage of the bipolar transistor used. In a "smart power" embodiment, all of the devices shown in the FIG. 8 can be integrated.

Of course, the disclosed primary embodiment may be varied in a large variety of ways. For example, the innovative idea can be adapted to other combinations of devices having different thresholds, e.g. the power FET could be replaced with another device having a high turn-on threshold (e.g. an IGBT or MCT).

For another example, alternative embodiments could change the control circuitry so that the bipolar transistor was permitted to remain on, in parallel with the MOS transistor, over at least part of the operating voltage range. (Of course, this would require that the bipolar transistor have appropriate heat-dissipation and surge-withstand capability.)

What is claimed is:

1. A power driver circuit comprising:
   control circuitry connected to provide a logic output in a first state whenever current should be passed between a load connection and a first power supply connection;
   first and second power transistors each having first and second current-carrying terminals thereof connected between said load connection and said power supply connection; said first transistor having a threshold voltage greater than one Volt, and said second transistor having a threshold voltage less than one Volt; and a comparator and switching circuit connected to monitor a power supply voltage, and accordingly to route said output of said control circuitry to a control terminal of said first transistor whenever the power supply voltage is within acceptable limits, and to a control terminal of said second transistor whenever the power supply voltage is NOT within acceptable limits.

2. The circuit of claim 1, wherein said comparator and switching circuit is connected to monitor said power supply voltage independently of said control circuitry.

3. The circuit of claim 1, wherein said first power supply connection is a ground connection.

4. The circuit of claim 1, wherein said comparator and switching circuit is connected to route said output of said control circuitry to said control terminal of said second transistor whenever the power supply voltage falls below a minimum acceptable limit.

5. A voltage regulator circuit, having voltage input terminals and a current output terminal, and comprising:

control circuitry connected to monitor the voltage across two voltage input terminals, and accordingly to provide a logic output in a first state whenever the voltage across said voltage input terminals falls below a predetermined threshold value;

first and second power transistors each having first and second current-carrying terminals thereof connected between a current output terminal of the regulator and a fixed potential; said first transistor having a threshold voltage greater than one Volt, and said second transistor having a threshold voltage less than one Volt; and a comparator and switching circuit connected to monitor the voltage difference between said input terminals, and accordingly to route said output of said control circuitry to a control terminal of said first transistor whenever said voltage difference is within acceptable limits, and to a control terminal of said second transistor whenever said voltage difference is NOT within acceptable limits.

6. The circuit of claim 5, wherein said comparator and switching circuit is connected to monitor the voltage difference between said input terminals independently of said control circuitry.

7. The circuit of claim 5, wherein said comparator and switching circuit is connected to route said output of said control circuitry to said control terminal of said second whenever the power supply voltage falls below a minimum acceptable limit.

8. An automotive electrical supply system, comprising:

an alternator having stator windings and a field winding, said stator windings being operatively connected through clamp diodes to provide a voltage between a system power supply line and a system ground connection;

a voltage regulator, having voltage input terminals and a current output terminal connected to drive said field winding of said alternator, comprising:

control circuitry connected to monitor the voltage across two voltage input terminals, and accordingly to provide a logic output in a first state whenever the voltage across said voltage input terminals falls below a predetermined threshold value;

first and second power transistors each having first and second current-carrying terminals thereof connected between a current output terminal of the regulator and a fixed potential; said first transistor having a Threshold voltage greater than one Volt, and said second transistor having a threshold voltage less than one Volt; and a comparator and switching circuit connected to monitor the voltage difference between said input terminals, and accordingly to route said output of said control circuitry to a control terminal of said first transistor whenever said voltage difference is within acceptable limits, and to a control terminal of said second transistor whenever said voltage difference is NOT within acceptable limits;

a battery connected to provide voltage between said system power supply line and ground connection when said alternator is not active; and a pre-excitation load operatively connected in series between said clamp diodes and one terminal of said battery.

9. The system of claim 8, wherein said threshold voltage is approximately 14 V.

10. The system of claim 8, wherein said fixed potential is one of said voltage input connections.

11. The system of claim 8, wherein said pre-excitation load is a lamp.

12. The system of claim 8, wherein said comparator and switching circuit is connected to monitor the voltage difference between said input terminals independently of said control circuitry.

13. The system of claim 8, wherein said comparator and switching circuit is connected to route said output of said control circuitry to said control terminal of said second transistor whenever the power supply voltage falls below a minimum acceptable limit.

14. An output stage comprising:

a power transistor subcircuit driving a load, which is connected to a first supply node, by connecting said load to a second supply node, and a control circuit connected to produce an output signal to control said power transistor subcircuit;

said power transistor subcircuit comprising a bipolar power transistor and a field effect power transistor, functionally connected in parallel to each other, each having an independent control terminal; and a comparator having a first input connected to said first supply node, a second input to which a reference voltage is applied, and an output connected to a control terminal of a switch which alternatively feeds said output signal produced by said control circuit to the control terminal of said bipolar junction transistor or to the control terminal of said field effect transistor.

15. An output stage as defined in claim 14, wherein said bipolar_power transistor is selected by said switch when the supply voltage drops below said reference voltage.

16. An output stage according to claim 14, wherein said power transistors are NPN and n-channel MOS, respectively.

17. An output stage as defined in claim 14, wherein said power transistors are PNP and p-channel MOS, respectively.

18. An output stage according to claim 15, wherein said bipolar power transistor has a current carrying capacity that is substantially less than the current carrying capacity of said field effect power transistor.

19. A regulating circuit for the output voltage of an alternator of an electric installation of self-generation and recharge of a storage battery, capable of forcing a pre-excitation current through a field winding of the alternator upon the closing of a startup switch of the system and to regulate the excitation current through said field winding of the running alternator, comprising:

a driver transistor having a control terminal connected to an output of a voltage regulating network of the circuit, said field winding and said regulating network being powered, through said start-up switch, by said battery, a bipolar transistor and a field effect transistor, functionally connected in parallel to each other, each having an independent control terminal;

a comparator having a first input connected to a supply node of said voltage regulating network, a second input to which a constant reference voltage is applied and an output connected to a control terminal of a switch capable of connecting said output of said voltage regulating network to the control terminal of said bipolar transistor or to the control terminal of said field effect transistor.

20. A regulating circuit as defined in claim 19, wherein said bipolar transistor is selected by said switch controlled by the comparator during a pre-excitation phase of said field winding of the alternator and said field effect transistor is selected by said switch during normal running of said alternator.

21. A regulating circuit according to claim 20, wherein said bipolar transistor has a current-carrying capacity that is less than the current carrying capacity of said field effect transistor.

22. A method for operating an output stage, comprising the steps of:

(a.) providing a power field-effect transistor in parallel with a power bipolar transistor;

(b.) monitoring a power-supply voltage level; and (c.) selectively driving said bipolar transistor but not said field-effect transistor, if said monitoring step indicates that the magnitude of the power-supply voltage level is above a predefined minimum level, and otherwise selectively driving said field-effect transistor but not said bipolar transistor, if said monitoring step indicates that the magnitude of the power-supply voltage level is below said predefined minimum level.

23. A method for operating an automotive voltage regulator, comprising the steps of:

(a.) generating current in an engine-driven alternator having a field coil and stator coils;

(b.) monitoring the system power-supply voltage, and accordingly (i.) providing drive current to said field coil, when required, through a field-effect transistor if the system power-supply voltage is below a target voltage but not below a low-voltage limit, and (ii.) providing drive current to said field coil, when required, through a bipolar transistor if the system power-supply voltage is below a target voltage and below said low-voltage limit.

* * * * *